United States Patent
Ohms et al.

(10) Patent No.: US 6,458,484 B2
(45) Date of Patent: *Oct. 1, 2002

(54) FIBER-STRUCTURE ELECTRODE SYSTEM FOR NICKEL-CADMIUM BATTERIES AND PROCEDURE FOR ITS MANUFACTURE

(75) Inventors: Detlef Ohms; Willi Kitzhöfer, both of Brilon; Uwe Schaffrath, Korbach; Gabor Benczur-Urmössy, Stuttgart, all of (DE)

(73) Assignee: Hoppecke Batterie Systeme GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,538

(22) Filed: Feb. 5, 1999

(30) Foreign Application Priority Data

Feb. 6, 1998 (DE) .......................... 198 04 650
Feb. 6, 1998 (DE) .......................... 198 04 649

(51) Int. Cl.⁷ ................................................ H01M 4/04
(52) U.S. Cl. ................................. 429/209; 429/235
(58) Field of Search ........................ 429/209, 66, 234, 429/235

(56) References Cited

U.S. PATENT DOCUMENTS 3,891,464 A    6/1975  Kinnerud et al.
5,364,713 A *  11/1994 VonBenda ............... 429/66
5,492,782 A *  2/1996  Higley ................... 429/164
5,888,916 A *  3/1999  Tadokoro ................ 442/334

FOREIGN PATENT DOCUMENTS

| CH | 251 508       | 8/1948 |
| DE | 1 192 281     | 5/1965 |
| DE | 297 05 169 U1 | 7/1997 |
| EP | 424 627 A2    | 5/1991 |
| EP | 421 18 381    | 5/1993 |
| EP | 795 916 A1    | 9/1997 |

* cited by examiner

Primary Examiner—Patrick Ryan
Assistant Examiner—Mark Ruthkosky
(74) Attorney, Agent, or Firm—Cantor Colburn LLP (57) ABSTRACT

In order to be able to produce prismatic, unsealed nickel-cadmium batteries without limiting the amount of electrolyte, the invention proposes the manufacture of an electrode system for nicad batteries under at least partial utilization of fibe- structure electrodes, for which purpose positive and negative lamellar electrodes are produced and, with separator material interlayered, stacked in alternating fashion in a defined number to form an electrode assembly. The respective equidirectional electrodes are mutually connected by means of connecting straps; the electrode assembly is pressed and positionally locked between mechanical clamping elements into a unitized, coplanar, undeformable block, under simultaneous compression of the separator material interlayered between the electrodes.

34 Claims, 5 Drawing Sheets

FIBER-STRUCTURE ELECTRODE SYSTEM FOR NICKEL-CADMIUM BATTERIES AND PROCEDURE FOR ITS MANUFACTURE

This invention relates to an electrode system for nickel-cadmium (nicad) batteries and to a procedure for its manufacture. The invention applies in particular o electrode systems for nicad batteries in which at least one type of electrode is produced by employing fiber-structure technology.

Conventional nicad batteries are produced with so-called self-baking or sintered electrodes. Sintered electrodes can be manufactured only up to a particular thickness, thus limiting the available energy density. The development of fiber-structure technology has brought improvements in this area. It employs metallized fiber structures which are produced by metallizing porus, nonwoven or needle-bonded fabric of electrically nonconducive, synthetic fibers. Fiber electrodes can be made thicker, thus allowing for smaller battery dimensions with the same energy density or the same battery dimensions with more power. As another advantage, fiber electrodes last longer. However, they do require a somewhat higher charging voltage than cells with sintered positive electrodes. This means that the need for higher charging voltages must be taken into account when using nicad batteries with fiber electrodes. Higher charging voltages in turn can have drawbacks in terms of water consumption.

Alkaline cells, like nicad batteries, can be of the sealed or open type.

In an open design, the gases forming at the charge or feed end are dissipated. The separator not only shields the electrodes but also prevents the gases from penetrating.

By contrast, in a sealed battery design the oxygen generated at the positive electrode is channeled directly to the split negative electrodes. This reduces the charging voltage at the feed end. In gas-tight nicad batteries with fiber electrodes the oxygen travels via the gas phase and a porous, gas-permeable intermediate layer between the negative electrodes. The sealed design makes it necessary to limit the amount of electrolyte so as to maintain adequate electrolyte-free gas passages. In the manufacture of sealed, fiber-technology-based nicad cells, the gas is evacuated from the cell enclosure and the unit is permanently sealed so as to control and facilitate the gas flow. Limiting the amount of electrolyte substantially reduces the thermal absorptivity of the cells, thus increasing the risk of overheating in the event the cells are overcharged.

Given the state of prior art as described, it is the objective of the present invention to provide the ability to produce prismatic nickel-cadmium batteries unlimited relative to the amount of electrolyte and incorporating fiber-structure electrodes which, while maintaining the charge-voltage-related advantages over conventional nicad batteries, are compatible with the latter, i.e. they do not require higher charging voltages and in terms of water consumption they need less maintenance. As an added objective, they should be easier to manufacture.

The proposed procedural approach to attaining that objective involves a process for the manufacture of electrode systems for nicad batteries involving at least the partial use of fiber electrodes, whereby positive and negative, lamellar electrodes are produced and, with separator material interpositioned, stacked in alternating fashion in a defined number to form an electrode assembly, with the respective equidirectional electrodes mutually connected by means of connecting straps; the said electrode assembly is pressed into a unitized, coplanar, solid block under compression of the separator material interlayered between the electrodes in a manner that at least in the pressed and installed state the unit impedes essentially any gas transfer in a direction parallel to the surfaces of the lamellar electrodes while permitting such gas transfer in a transverse direction relative to the lamellar electrodes, with cavities being provided for the temporary storage of gas.

The material employed for the separator layers is a nonwoven fiber fleece at least 0.5 to about 1 mm thick which offers sufficient gas storage capacity and corresponding weight per unit area, which can be entirely or partially covered with electrolyte and which preferably consists of a polyamide or polyolefin or a similar polymer or a mixture of these substances, with polyamide being the preferred material. The separator material should maintain a lasting degree of elasticity assuring permanent, mechanically flush contact with the electrodes.

Surprisingly, it has been found that the electrode assemblies produced by the method according to this invention not only do not alter the advantages of fiber electrode-based nicad batteries over conventional nicad batteries but in fact need only low charging voltages, making them compatible with the other systems, while at the same time requiring less maintenance due to substantially less water consumption compared to conventional nicad batteries. This is due to the retention of the oxygen formed in the transfer phase in the electrode assembly and its subsequent dissipation at the negative electrode, as well as to improved thermal balance which is further helped by the application of lower charging voltages. The key requirement is that the compression take place prior to the so-called start-up charge, meaning the initial charge, and that the electrode assembly be locked in place in its compressed, undeformable state.

The assumption is that the oxygen absorptivity and retention capacity of the separator material and the consequently uniform oxygen dissipation at the negative electrode constitute an essential aspect of this invention. From among the many different separator materials, only fleece-type separators lend themselves to this purpose. They consist of statistically distributed, i.e. random fibers in contrast to directionally structured fabrics containing fiber combinations following specific preferential directional patterns. Unlike other separator materials, these nonwoven fiber fleece separators are highly porous, their porosity factor being between 70 and 90%. Due to the elasticity of the fleece separators relative to their thickness perpendicular to the electrode surfaces, the compression and positional fixation during the stacking of the cells will cause the separators to completely fill the space between the electrodes. With a moderate, controlled charge rate, i.e. charging current, the gaseous oxygen produced at the positive electrode will not escape from the electrode assembly but will fill the pores, displacing the electrolyte. At the negative-electrode interface the oxygen is dissipated, depolarizing the electrode. A controlled charge rate can be obtained for instance by keeping the charging voltage constant, a type of control that is not suitable for the aforementioned gas-tight nickel-cadmium cells. The oxygen generated at the positive electrodes during operation is neither removed from the space between neighboring electrodes nor directly channeled to the negative electrodes by the separator material; instead, it is only partly fed to the negative electrode and partly stored in interim fashion. This assures an extended, continuous gas feed to the negative electrode, limiting the charge state of the latter and thus the polarization that would engender a rising, final charging voltage. The even oxygen dissipation and the surplus electrolyte reduce the chance of an overheating.

Compressing the electrode assembly blocks the separator to any oxygen movement parallel to the electrode surfaces while in the transverse direction a resistance to the oxygen transfer is produced that causes the oxygen to be stored. It is important that a significant portion of the oxygen that formed in the transfer phase, perhaps between 70 and 98%, be dissipated in that fashion, even though the cell would function without quantitative limitation of the electrolyte. In fact, the cells contain a substantial electrolyte surplus, with the level of electrolyte extending to above the upper edge of the stacked-electrode unit in a manner similar to that in open nickel-cadmium cells.

It is desirable to obtain compression to a predefined inter-electrode spacing and/or a specified state of compression of the separator and/or with a specific compression-force setpoint.

According to one desirable approach proposed by this invention, the separator selected consists of a permanently elastic material which, interlayered between the electrodes, is preferably compressed to 70 to 90% of its original thickness. The separator material used is in the form of so-called fiber fleece which, according to a particularly advantageous concept within this invention, is applied in a multilayer configuration. In another desirable embodiment of this invention the separator can be in the form of pockets surrounding the electrodes. This will automatically produce a multilayer configuration which also serves to protect the edges. Moreover, the pocket approach significantly facilitates the handling of the electrodes.

Apart from the above, the separator performs its usual, conventional functions, providing electrical isolation and offering at least traditional ion conductivity with a full level of electrolyte.

As a desirable aspect it is proposed that prior to the placement of the separator material the electrode plates be surface-leveled, referred to as a so-called precalibration. According to one concept of the invention, such precalibration can be performed on filled and dried electrodes by mechanical means using rollers, whereby protruding or dendrite-promoting metallized fiber tips or metallized residual fibers are largely removed, minimizing the roughness of the electrode surfaces. Minimized surface roughness is particularly important, given that the compression of the electrode assembly produces a permanently elastic, full-face contact between the surface of the lamellar electrode and the separator material which virtually eliminates any gas migration along the surface of the electrode plate.

The compression and/or fixation of the electrode assembly can be performed prior to installation in a cell enclosure or even in a cell enclosure.

The application of the procedure according to this invention has been found to be particularly advantageous for electrodes employing metallized fiber structures produced by metalizing porous nonwoven fleece materials or needle-bonded fabric consisting of electrically nonconductive synthetic fibers, where the textile base structure displays a porosity of between 50% and 98%, the fiber diameter is between 5 and 40 m, the weight per area unit of the nonwoven fleece or needle-bonded fabric is between 50 g/m and 800 g/m and the thickness of the textile material is in the range between 0.5 and 5 mm.

With the procedure according to this Invention it is possible to produce nicad batteries which are smaller and lighter than conventional batteries of equal capacity, which are compatible in terms of the charging voltage and which require a comparable measure of maintenance. The electrode systems manufactured employing the method according to this invention are novel and neither known nor suggested on the basis of prior art.

In terms of the devices employed to attain the objective, the invention proposes an electrode system for nicad batteries at least partially equipped with fiber-structure electrodes, whereby a predefined number of positive and negative electrodes produced in lamellar form are stacked in alternating fashion with the interlayering of separator material to constitute an electrode assembly in which the equidirectional electrodes are mutually connected by means of connecting straps; the said electrode assembly is pressed, between mechanical clamps, into a unitized, coplanar, solid block under compression of the separator material interlayered between the electrodes. It is desirable to use a separator material which at least in the compressed and installed state impedes essentially any gas transfer in a direction parallel to the surfaces of the lamellar electrodes while permitting such gas transfer in a transverse direction relative to the lamellar electrodes, with cavities being provided for the intermediate storage of gas.

The material employed for the separator layers is a nonwoven fiber fleece sufficiently thick to ensure adequate gas storage capacity and corresponding weight per unit area, which can be entirely or partially covered with electrolyte and which preferably consists of a polyamide or polyolefin or a similar polymer or a mixture of these substances, with polyamide being the preferred material. The separator material should maintain a lasting degree of elasticity assuring permanent, mechanically flush contact with the electrodes.

Prior to installation in a cell enclosure, the electrode plates can first be pressed and then locked in place by appropriate retaining elements. For example, frame-clamping plates can be placed on the outer electrode plates and, after the compression process, connected by means of clamping bars extending along the lateral edges of the electrode plate. The frame can be welded on, attached with screws or the like and/or made adjustable, allowing for the adjustment of the thickness and pressure values of the assembly.

As a desirable aspect it is proposed that the outer electrode plates be negative plates on which the clamping frame can be mounted without requiring the interpositioning of separator material.

The electrode system according to this invention permits the manufacture of advanced nicad batteries which compared to conventional nicad batteries of equal capacity are lighter and smaller, which are compatible in terms of the necessary charging voltage and require a comparable measure of maintenance. The electrode systems according to this invention are novel and are not known or suggested on the basis of prior art.

Additional advantages and features of the invention become evident from the following description with the aid of the drawings in which.

In the individual diagrams, identical components bear identical reference numbers.

Figure 1:
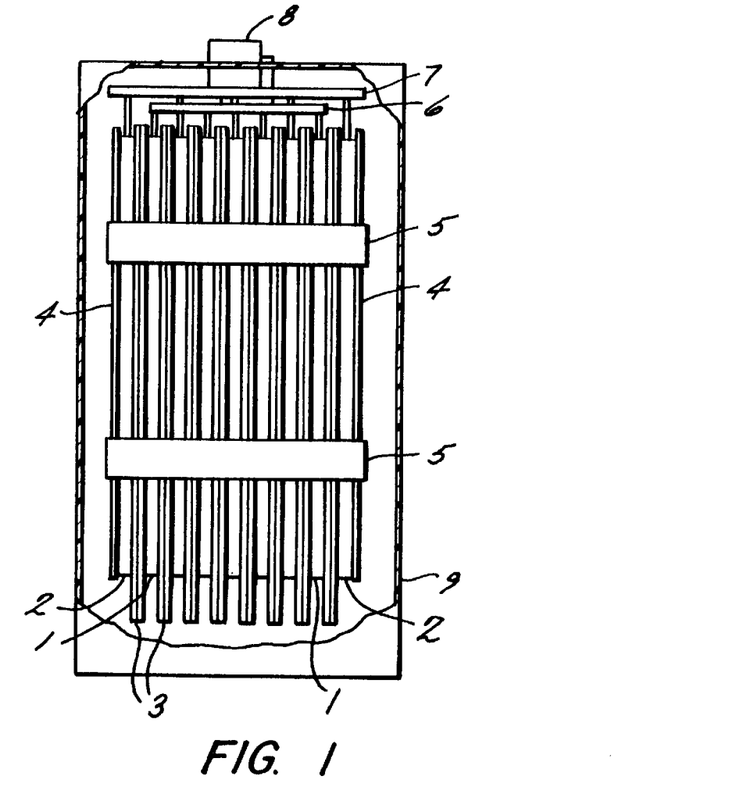
FIG. 1 is a lateral aspect of a design example of an electrode system according to this invention.
Figure 2:
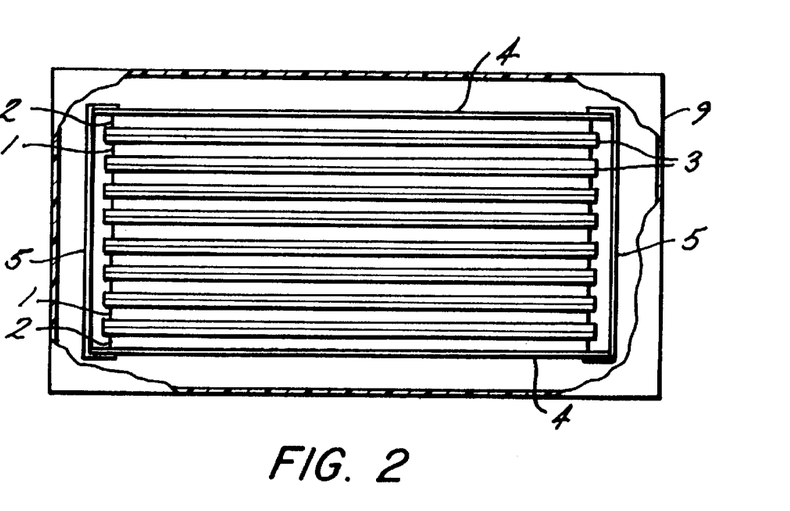
FIG. 2 is a bottom view of the design example.

The positive electrodes 1 and negative electrodes 2, preferably in the form of so-called fiber-structure electrodes, are stacked in alternating fashion into an electrode assembly with the interlayering of separator material 3. The positive electrodes 1 are connected to a pole plate 6, the negative electrodes 2 to a pole plate 7 isolated from the former and provided with a terminal post 8. Pressure plates 4 are placed on both sides of the electrodes and connected by clamping elements 5, preferably consisting of clamping bars or tensioning clamps. These may be welded or bolted on or connected in some other manner. The assembly is inserted in a cell enclosure 9.

Figure 3:
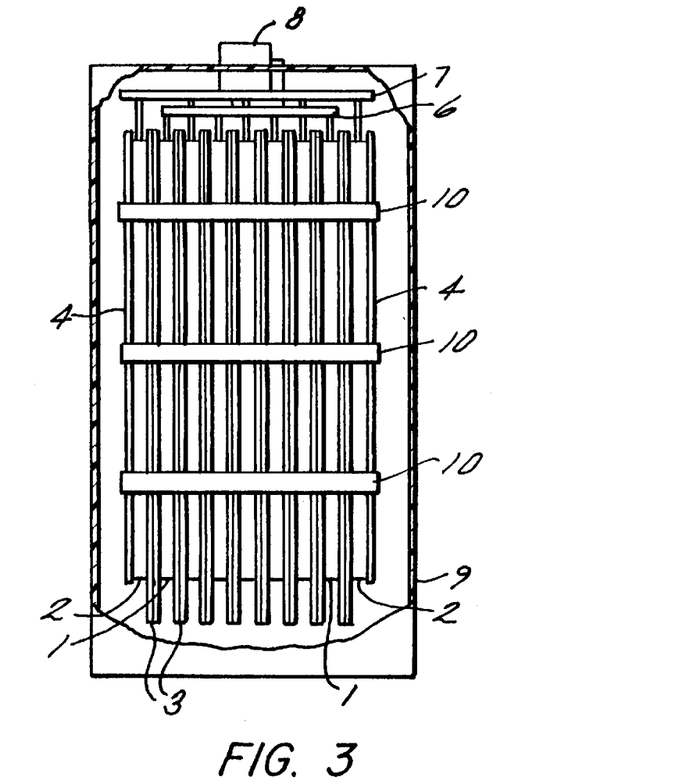
FIG. 3 shows one possible mode of locking the stacked electrodes in place, using elastic clamping straps around the pressure plates.
Figure 4:
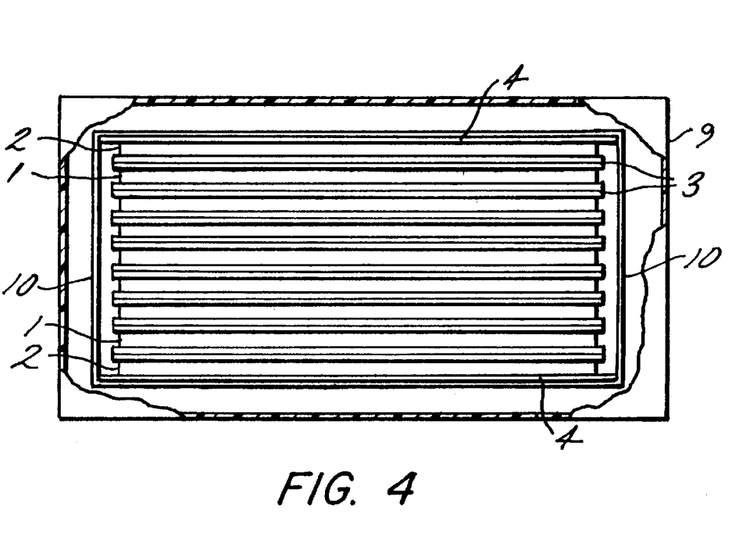
FIG. 4 is a bottom view of the system per FIG. 3.

FIGS. 3 and 4 show an alternative embodiment in which the electrode stack is again provided with pressure plates 4 on both sides except that these are connected by clamping straps 10. The connection of the clamping straps 10 may be made by welding, gluing or other essentially conventional bonding techniques.

Figure 5:
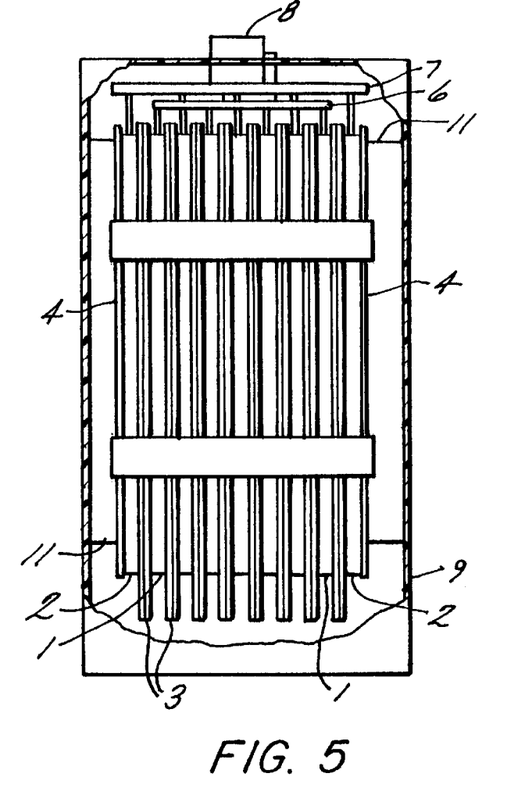
FIG. 5 shows another possible mode of locking the stacked electrodes in place, using retaining elements which deflect the pressure applied on the walls and edges of the cell.
Figure 6:
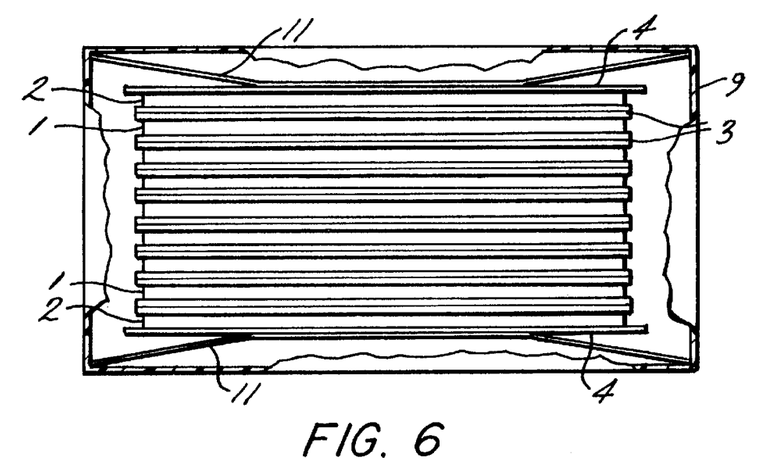
FIG. 6 is a bottom view of the system per FIG. 5.

Another alternative embodiment is illustrated in FIGS. 5 and 6. Pressure plates 4 are provided on both sides of the electrode plates. However, the compressed unit is locked in place in the cell enclosure 9 by suitable retaining elements 11. These retaining elements 11 are preferably positioned within the cell enclosure in such fashion that the forces applied are channeled off by way of the corners. A stack of electrodes compressed outside the enclosure is fixed in place inside the enclosure by means of the retaining elements 11.

Figure 7:
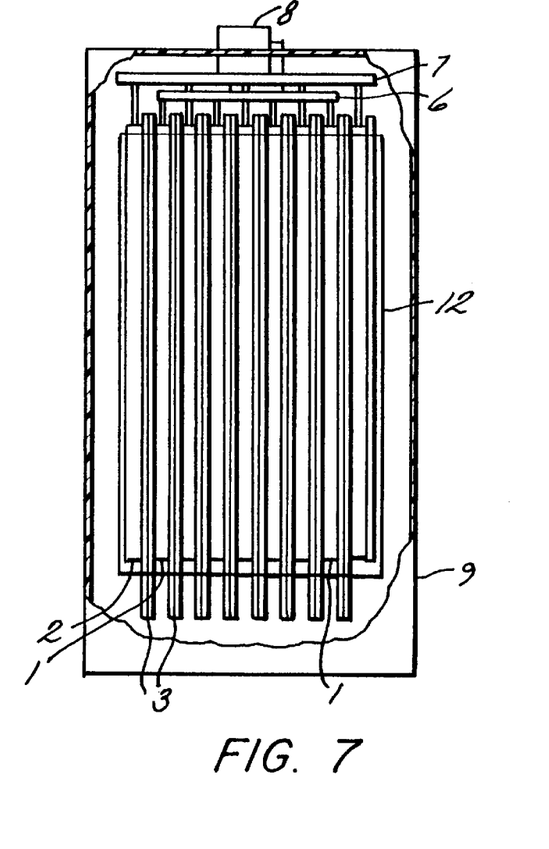
FIG. 7 shows the use of pressure shells welded or bolted on or otherwise attached in form-fitting, force-locking fashion.
Figure 8:
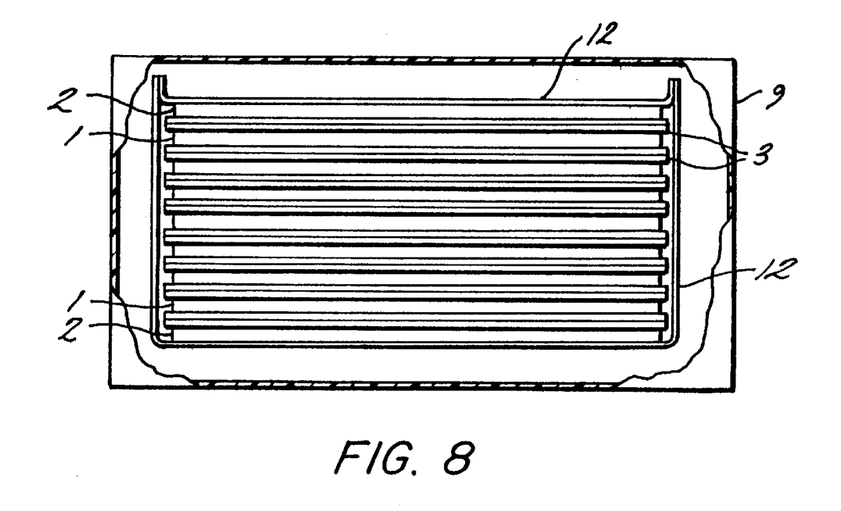
FIG. 8 is a bottom view of the system per FIG. 7.

FIGS. 7 and 8 show another alternative design version. In this case, the pressure plates on both sides of the electrodes are replaced by pressure shells 12 which, during the assembly process, are forced together and locked in place by a suitable form-fitting and force-locking coupling method. It may be desirable to connect the shells by spot-welding.

Figure 9:
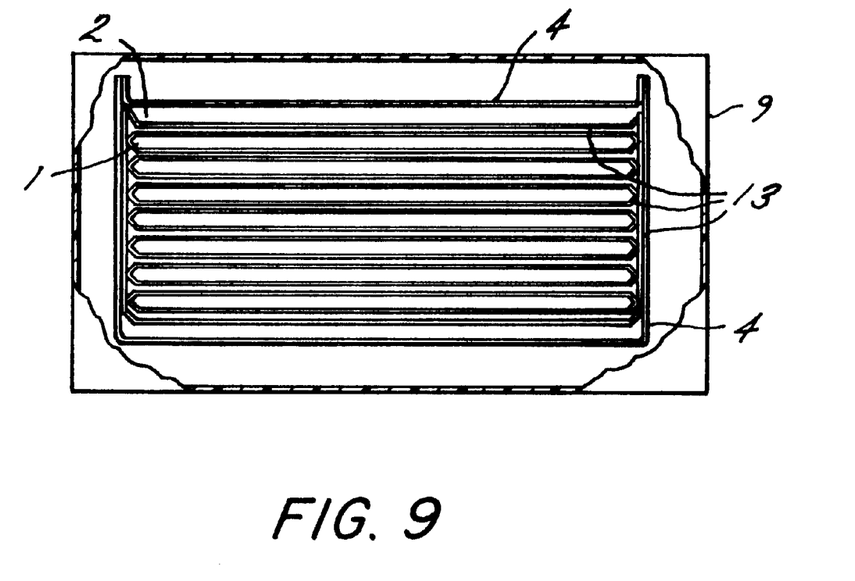
FIG. 9 shows the use, by way of example, of separator pockets around all electrodes in the design version per FIGS. 7 and 8.

Finally, FIG. 9 illustrates the use of separator pockets surrounding each electrode, applied in the design example per FIGS. 7 and 8.

The separator pockets 13, consisting for instance of a nonwoven fleece, wrap around each electrode plate. The pockets surrounding the outer negative electrodes are cut open and serve to protect the lateral edges of the electrodes.

The design examples described are intended for explanatory purposes and the invention is not limited to

What is claimed is:

1. A process for the manufacture of electrode systems for Ni-Cd batteries, comprising;
    providing positive and negative lamellar electrodes, said electrodes including a fiber-structure;
    interlayering said positive and negative lamellar electrodes with a separator material;
    stacking a predetermined number of said positive and negative lamellar electrodes in alternating fashion to form an electrode assembly;
    mutually connecting respective equidirectional electrodes by at least one connecting strap; and
    pressing and positionally locking said electrode assembly into a unitized, coplanar, solid block under compression of said separator material interlayered between said electrodes, wherein said separator material is selected so that at least in the compressed state and fixed state it displays different gas permeability in different directions, whereby said separator material impedes essentially any gas transfer in a direction parallel to surfaces of said lamellar electrodes while permitting such gas transfer in a transverse direction relative to the lamellar electrodes, with cavities being provided for temporary storage of gas.

2. The process as set forth in claim 1, wherein compression of said separator material comprises applying a predefined pressure.

3. The process as set forth in claim 1, wherein the separator material is a permanently elastic material.

4. The process as set forth in claim 1, wherein within said stack of electrodes or in a cell, said separator material is compressed to 70 to 90% of its original thickness.

5. The process as set forth in claim 1, wherein said separator material comprises a nonwoven fiber fleece.

6. The process as set forth in claim 1, wherein said separator material is applied in multiple layers.

7. The process as set forth in claim 1, wherein said separator material is of a thickness corresponding to a weight per unit area of between 70 and 200 g/m$^2$.

8. The process as set forth in claim 1, wherein said separator material is shaped in the form of pockets in which said electrodes are inserted.

9. The process as set forth in claim 1, further comprising leveling surfaces of said electrodes before said interlayering of said electrodes with said separator material.

10. The process as set forth in claim 1, wherein the electrode assembly is compressed prior to being installed in a cell enclosure.

11. The process as set forth in claim 10, wherein compressing said electrode assembly is performed inside said cell enclosure.

12. An electrode system for Ni-Cd batteries, comprising:
    positive and negative electrodes including a fiber-structure comprising an electrically nonconductive synthetic fiber material being metallized;
    a separator material interlayered between said positive and negative electrodes, wherein a predetermined number of positive and negative electrodes interlayered by said separator material are stacked in alternating fashion to form an electrode assembly; and
    a connecting strap mutually connecting respective electrodes;
        wherein said electrode assembly is fixed between mechanical clamping elements and is under compression of said separator material.

13. The electrode system as set forth in claim 12, wherein said separator material comprises a material which at least in the installed, compressed state impedes essentially any gas transfer in a direction parallel to surfaces of said lamellar electrodes while essentially permitting such gas transfer in a transverse direction relative to said lamellar electrodes, with cavities being provided for temporary storage of gas.

14. The electrode system as set forth in claim 12, wherein said separator material is a permanently elastic material.

15. The electrode system as set forth in claim 12, wherein within said stack of electrodes or in a cell, said separator material is compressed to 70 to 90% of its original thickness.

16. The electrode system as set forth in claim 12, wherein said separator material comprises a nonwoven fiber fleece.

17. The electrode system as set forth in claim 12, wherein said separator material is applied in multiple layers.

18. The electrode system as set forth in claim 12, wherein said separator material is shaped in the form of pockets in which said electrodes are inserted.

19. The electrode system as set forth in claim 12, wherein said electrodes are provided with level-treated surfaces.

20. The electrode system as set forth in claim 12, wherein said compression and fixation within a battery cell enclosure is provided by a retaining support of said cell enclosure.

21. The electrode system as set forth in claim 20, wherein said retaining support is provided in the area of edges of said cell enclosure.

22. The electrode system as set forth in claim 12, wherein said electrodes are mounted in a clamping frame.

23. The electrode system as set forth in claim 22, wherein said clamping frame is of a cage-like configuration.

24. The electrode system as set forth in claim 22, wherein said clamping frame incorporates tensioning clamps.

25. The electrode system as set forth in claim 22, wherein said clamping frame is adjustable.

26. The electrode system as set forth in claim 22, wherein said clamping frame includes frame elements welded together.

27. The electrode system as set forth in claim 22, wherein said clamping frame includes elements screwed together.

28. The electrode system as set forth in claim 22, wherein said clamping frame includes elements joined in form-fitting fashion.

29. The electrode system as set forth in claim 22, wherein said clamping frame is made of metal or metal-clad plastic, for which metal components comprise ferrous materials, nickel, or nickel-plated ferrous materials.

30. The electrode system as set forth in claim 12, wherein outer plates of said electrode assembly include plates of said negative electrodes.

31. The electrode system as set forth in claim 30, wherein clamping frame elements are applied to said outer negative electrode plates without the interpositioning of said separator material.

32. The electrode system as set forth in claim 12, wherein lateral edges of said electrode are protected by said separator material.

33. The electrode system as set forth in claim 12, wherein said electrodes are provided with connecting lugs for connection to elastic connecting straps.

34. The electrode system as set forth in claim 12, further including an electrolyte, wherein the level of said electrolyte is above an edge of an upper electrode plate.

* * * * *

UNITED STATES PATENT AND TRADEMARK OFFICE
CERTIFICATE OF CORRECTION

PATENT NO. : 6,458,484 B2
APPLICATION NO. : 09/245538
DATED : October 1, 2002
INVENTOR(S) : Ohms et al.

It is certified that error appears in the above-identified patent and that said Letters Patent is hereby corrected as shown below:

Title Page:
Item (57) Abstract, line 5, after "of" delete "fibe- structure" and insert therefor
-- fiber-structure --

Column 1:
Line 7, after "particular" delete "o" and insert therefor -- to --
Line 17, after "metallizing" delete "porus" and insert therefor -- porous --

Signed and Sealed this

First Day of May, 2007

JON W. DUDAS
*Director of the United States Patent and Trademark Office*